(12) United States Patent
Hsieh et al.

(10) Patent No.: US 7,990,721 B2
(45) Date of Patent: Aug. 2, 2011

(54) COMPUTER SYSTEM WITH HEAT SINK

(75) Inventors: Chung-Cheng Hsieh, Taipei Hsien (TW); Ching-Wei Hsu, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/715,649

(22) Filed: Mar. 2, 2010

(65) Prior Publication Data

US 2011/0116227 A1    May 19, 2011

(30) Foreign Application Priority Data

Nov. 13, 2009   (CN) .................... 2009 2 0314722 U

(51) Int. Cl.
*H05K 7/20*   (2006.01)
(52) U.S. Cl. ........ 361/719; 361/704; 361/707; 165/80.3
(58) Field of Classification Search ........................ None
See application file for complete search history.

(56) References Cited

U.S. PATENT DOCUMENTS

| | | | |
|---|---|---|---|
| 6,384,331 B1 * | 5/2002 | Ku | 174/548 |
| 7,835,153 B2 * | 11/2010 | Kearns | 361/719 |
| 2010/0027220 A1 * | 2/2010 | Hughes et al. | 361/702 |

* cited by examiner

*Primary Examiner* — Boris L Chervinsky
(74) *Attorney, Agent, or Firm* — D. Austin Bonderer

(57) ABSTRACT

A computer system includes a chassis, a motherboard, an isolation component, and a block. The chassis includes a bottom wall, and a sidewall connected to the bottom wall. The motherboard is secured to the chassis. A heat sink is secured to the motherboard for cooling a chip mounted on the motherboard. An isolation component is secured to the chassis between the bottom wall and the motherboard. The isolation component includes a bent piece attached to the side wall and positioned between the heat sink and the sidewall. A distance is defined between the bent piece and the heat sink. The block is attached to the bent piece and positioned between the heat sink and the sidewall to span the distance.

17 Claims, 3 Drawing Sheets

COMPUTER SYSTEM WITH HEAT SINK

BACKGROUND

1. Technical Field

The present disclosure relates to a computer system with a heat sink.

2. Description of Related Art

Chassis and motherboards can come in many shapes and sizes and normally require heat sinks designed for each shape and size combination which adds costs to design and manufacture computer systems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
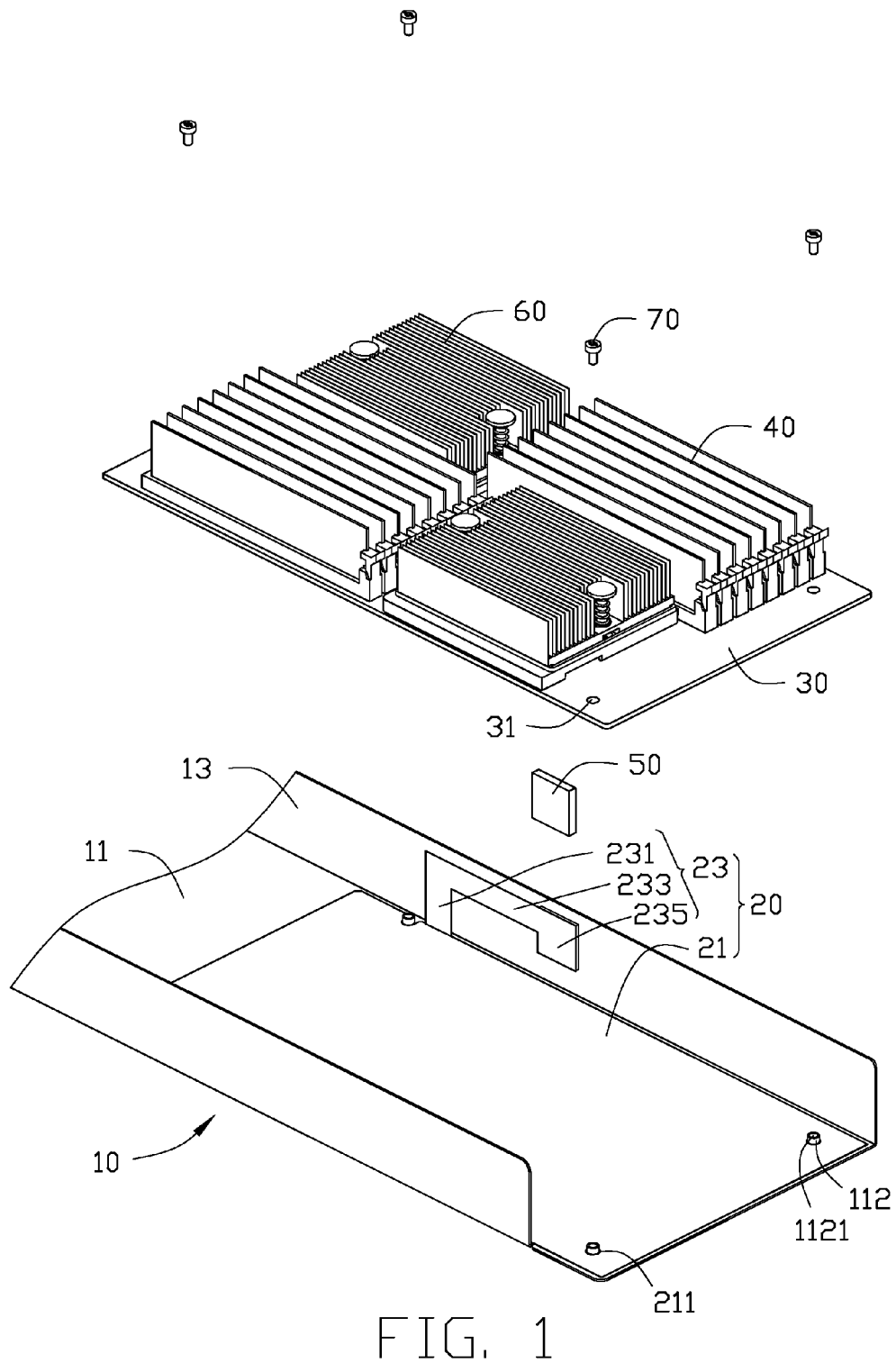
FIG. 1 is an exploded, isometric view of a computer system in accordance with an exemplary embodiment.

Referring to FIG. 1, a computer system in accordance with an exemplary embodiment includes a chassis 10, an isolation component 20, a motherboard 30, and two blocks 50 (only one is shown in FIG. 1).

The chassis 10 is configured for receiving the motherboard 30 and includes a bottom wall 11, and two sidewalls 13. In one exemplary embodiment, the sidewalls 13 are substantially parallel to each other and substantially perpendicular to the bottom wall 11. A plurality of positioning posts 112, each with a fastener hole 1121, is located on the bottom wall 11.

The isolation component 20 includes a main body 21 and two bent pieces 23 (only one is shown in FIG. 1), bent from opposite edges of the main body 21. The main body 21 defines a plurality of through holes 211, for receiving the positioning posts 112. Each bent piece 23 includes a first portion 231, a second portion 233, and a third portion 235. The first portion 231 connects the main body 21 to the second portion 233. The second portion 233 connects the first portion 231 to the third portion 235. In one exemplary embodiment, the first portion 231 extends in a first direction substantially perpendicular to the bottom wall 11 of the chassis 10, and the second portion 233 extends in a second direction substantially parallel to the bottom wall 11. In one exemplary embodiment, the isolation component is a thin plate.

The motherboard 30 is capable of being secured to the bottom wall 11 of the chassis 10. Two groups of memory cards 40 and two heat sinks 60 are secured to the motherboard 30. The heat sinks 60 are capable of cooling chips mounted on the motherboard 30. In one exemplary embodiment, the groups of memory cards 40 and the heat sinks 60 are arranged in a diagonal line. A plurality of holding holes 31 is defined in the motherboard 30.

Each block 50 is capable of being secured between one third portion 235 of the isolation component 20 and one adjacent sidewall 13. In one exemplary embodiment, the blocks 50 may be rectangular and made of biaxially-oriented polyethylene terephthalate (boPET) with sponge, such as Mylar or other materials, which can isolate the heat sinks 60 from the sidewalls 13 of the chassis 10.

Figure 2:
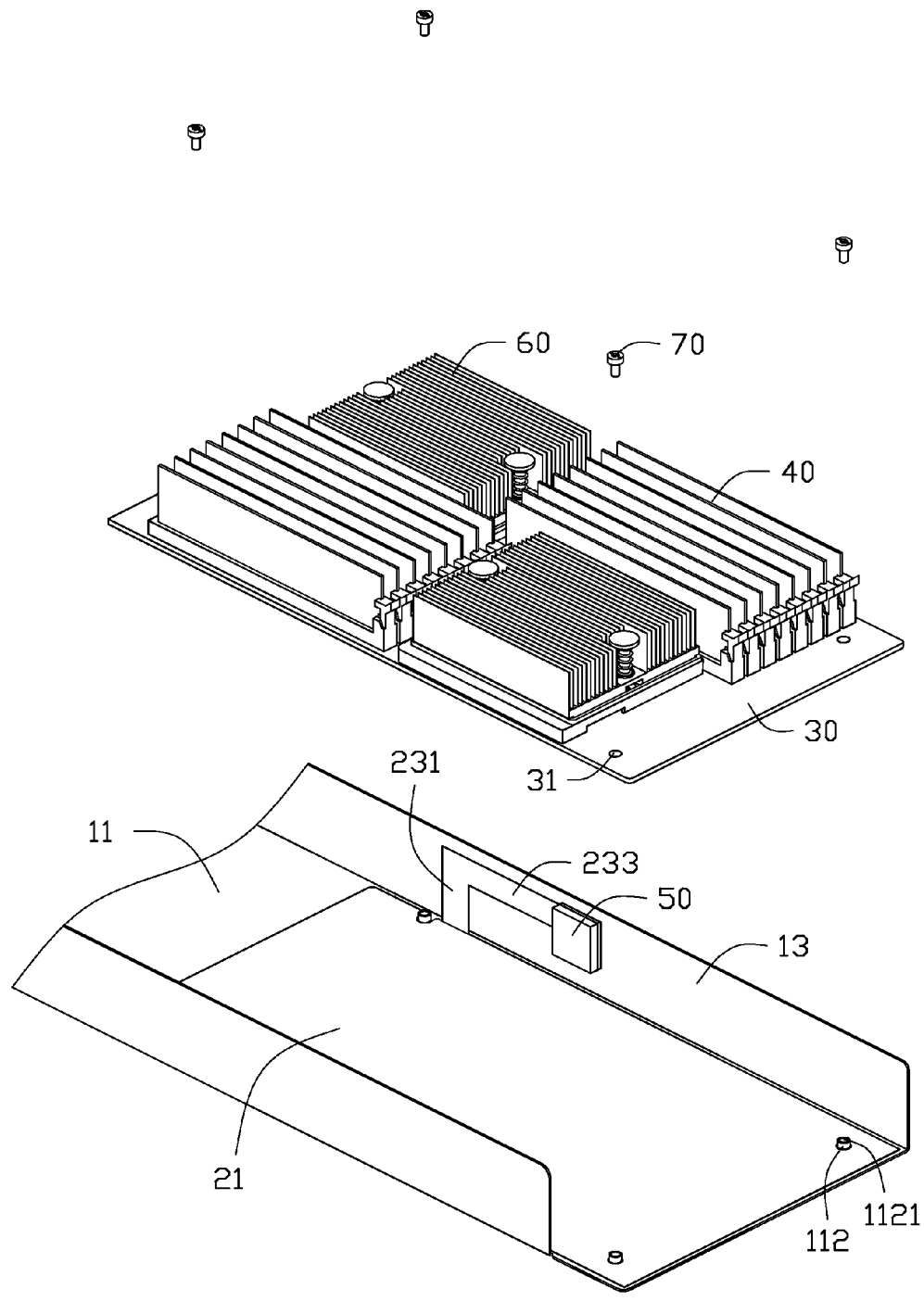
FIG. 2 is an assembled view of a chassis, an isolation component, and two blocks of an exemplary embodiment of the computer system of FIG. 1.
Figure 3:
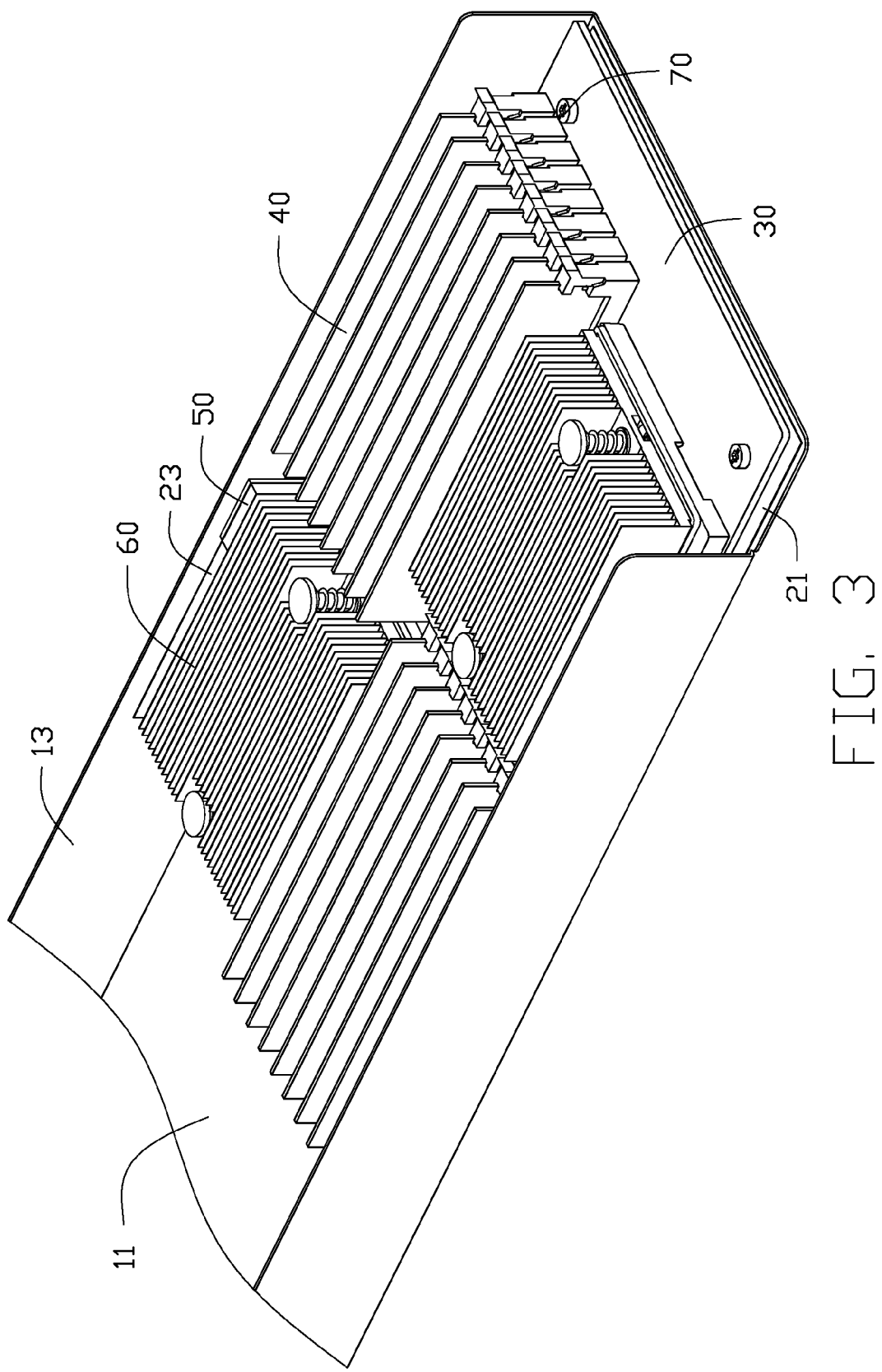
FIG. 3 is an assembled view of an exemplary embodiment of the computer system of FIG. 1.

Referring to FIGS. 1-3, the isolation component 20 is placed in the chassis 10. The main body 21 is placed on the bottom wall 11, and the positioning posts 112 are inserted into the through holes 211. The bent pieces 23 are close to inner surfaces of the sidewalls 13. The third portions 235 of the bent pieces 23 are attached to the inner surface of the sidewalls 13, by means such as pasting. The blocks 50 are attached to the third portions 235, by means such as pasting.

The motherboard 30 is placed in the chassis 10. The positioning posts 112 are inserted into the holding holes 31. A plurality of fasteners 70 is screwed into the fastener holes 1121 to secure the motherboard 30 to the chassis 10. The main body 21 of the isolation component 20 is located between the motherboard 30 and the bottom wall 11 of the chassis 10. Each bent piece 23 is positioned between one heat sink 60 and the one adjacent sidewall 13, and a distance is defined between each bent piece 23 and the adjacent heat sink 60. The blocks 50 are located between the heat sinks 60 and the sidewalls 13, to span the distance and abut the heat sinks 60 and the bent pieces 23.

In use, airflow, which would pass through space between the heat sinks 60 and the adjacent sidewalls 13, can be blocked by the blocks 50. This would increase quantity of air flowing over the heat sinks 60 and the memory cards 40, to improve efficiency for cooling the chips.

The heat sinks 60 are suitable for use with chassis and motherboard combinations of various size and alleviate the need for a different size heat sink for each different chassis and motherboard combination, thus saving design and manufacturing costs.

In the present disclosure, the isolation component 20 is capable of preventing the motherboard 30 from electronically coupling to the bottom wall 11 of the chassis 10. The blocks 50 and the bent piece 23 of the isolation component 20 are capable of preventing the heat sinks 60 from the sidewalls 13 of the chassis 10.

In an alternative exemplary embodiment, the blocks 50 can be directly secured to the sidewalls 13 to span the distances between the heat sinks 60 and the sidewalls 13.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
   a chassis comprising a bottom wall, and a sidewall connected to the bottom wall;
   a motherboard secured to the chassis; a heat sinks secured to the motherboard for cooling a chip mounted on the motherboard;
   an isolation component secured to the chassis between the bottom wall and the motherboard; the isolation component comprising a bent piece attached to the side wall and positioned between the heat sink and the sidewall; wherein a distance is defined between the bent piece and the heat sink; and a block attached to the bent piece and positioned between the heat sink and the sidewall to span the distance.

2. The computer system of claim 1, wherein the sidewall of the chassis is substantially perpendicular to the bottom wall.

3. The computer system of claim 1, wherein a plurality of positioning posts is located on the bottom wall of the chassis; the isolation component defines a plurality of through holes that receive the positioning posts; and the motherboard defines a plurality of holding holes that receive the positioning posts.

4. The computer system of claim 3, wherein each positioning post defines a fastener hole; and a fastener is screwed into each of the fastener holes to secure the motherboard and the isolation component to the chassis.

5. The computer system of claim 1, wherein the isolation component further comprises a main body secured between the motherboard and the bottom wall of the chassis; and the bent piece extends from the main body.

6. The computer system of claim 5, wherein the bent piece comprises a first portion, a second portion, and a third portion; the first portion extends from the main body; and the second portion connects the first portion and the third portion.

7. The computer system of claim 5, wherein the first portion of the bent piece extends in a direction substantially perpendicular to the bottom wall of the chassis; and the second portion extends in a direction substantially parallel to the bottom wall.

8. The computer system of claim 5, wherein the block is secured to the third portion of the bent piece.

9. A computer system comprising:

a chassis comprising a bottom wall, and two sidewalls connected to the bottom wall;

a motherboard secured to the chassis; two heat sink secured to the motherboard respectively adjacent to the sidewalls, for cooling a chip mounted on the motherboard; wherein a distance is defined between one heat sink and one sidewall adjacent to the one heat sink; and two blocks positioned between the heat sinks and the sidewalls to span the distances.

10. The computer system of claim 9, wherein the sidewalls of the chassis are substantially perpendicular to the bottom wall.

11. The computer system of claim 9, wherein a plurality of positioning posts is located on the bottom wall of the chassis; the isolation component defines a plurality of through holes that receive the positioning posts; and the motherboard defines a plurality of holding holes that receive the positioning posts.

12. The computer system of claim 11, wherein each positioning post defines a fastener hole; and a fastener is screwed into each of the fastener holes to secure the motherboard and the isolation component to the chassis.

13. The computer system of claim 9, wherein an isolation component is secured between the bottom wall and the motherboard; and the isolation component comprises two bent pieces positioned between the heat sinks and the sidewalls.

14. The computer system of claim 13, wherein the isolation component further comprises a main body secured between the motherboard and the bottom wall of the chassis; and the bent pieces extend from the main body.

15. The computer system of claim 14, wherein each bent piece comprises a first portion, a second portion, and a third portion; the first portion extends from the main body; and the second portion connects the first portion and the third portion.

16. The computer system of claim 14, wherein the first portion of each bent piece extends in a direction substantially perpendicular to the bottom wall of the chassis; and the second portion extends in a direction substantially parallel to the bottom wall.

17. The computer system of claim 14, wherein the blocks are secured to the third portions of the bent pieces.

* * * * *